(12) United States Patent
Carlson et al.

(10) Patent No.: US 7,257,199 B2
(45) Date of Patent: Aug. 14, 2007

(54) TELEPHONY BASED REMOTE LOCATION MONITORING

(75) Inventors: Michael Pierre Carlson, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 10/718,094

(22) Filed: Nov. 20, 2003

(65) Prior Publication Data

US 2005/0111629 A1  May 26, 2005

(51) Int. Cl.
*H04M 1/24* (2006.01)
*H04M 3/08* (2006.01)
*H04M 3/22* (2006.01)

(52) U.S. Cl. ............... 379/35; 379/32.01; 379/32.04

(58) Field of Classification Search ................ 379/35, 379/44, 46, 74–75, 93.02–93.03, 93.37, 100.05, 379/102.01–102.02, 32.01, 32.04; 455/516–519, 455/90.2
See application file for complete search history.

(56) References Cited

U.S. PATENT DOCUMENTS

| | | | | |
|---|---|---|---|---|
| 4,304,963 A * | 12/1981 | Conrad | ................ | 381/77 |
| 4,527,015 A * | 7/1985 | Chambers et al. | ..... | 379/102.01 |
| 4,996,709 A * | 2/1991 | Heep et al. | .................. | 379/160 |
| 6,411,682 B1 | 6/2002 | Fuller et al. | ................ | 379/67.1 |
| 6,466,766 B1 | 10/2002 | Treatch | ........................ | 455/20 |
| 6,501,740 B1 | 12/2002 | Sun et al. | .................... | 370/261 |
| 6,516,200 B1 | 2/2003 | Scmidt et al. | .............. | 455/518 |
| 2003/0017836 A1 | 1/2003 | Vishwanatan et al. | ....... | 455/517 |
| 2003/0078066 A1 | 4/2003 | Maggenti et al. | ........... | 455/518 |
| 2004/0047456 A1* | 3/2004 | Lahutsky | ................ | 379/102.01 |
| 2006/0058052 A1* | 3/2006 | Plestid et al. | ................ | 455/519 |

FOREIGN PATENT DOCUMENTS

| | | |
|---|---|---|
| EP | 0544100 A | 6/1993 |
| EP | 0635962 A | 1/1995 |
| FR | 2813489 | 3/2002 |
| WO | WO9524777 A1 | 9/1995 |

* cited by examiner

*Primary Examiner*—Binh K. Tieu
(74) *Attorney, Agent, or Firm*—Mark S. Walker; Amy J. Pattillo

(57) ABSTRACT

A method, system, and program for telephony based remote location monitoring are provided. A telephone network receives the caller request to listen only to a remote location telephony device. The telephone network allocates a listen only channel between the caller telephony device and the remote location telephony device. The telephone network activates a microphone at the remote location telephony device via the listen only channel. Then, audio detected at the microphone is streamed via the listen only channel to the caller telephony device, such that the telephone network enables a caller to monitor a remote location through the remote location telephony device with minimized allocation of telephone network resources.

33 Claims, 8 Drawing Sheets

TELEPHONY BASED REMOTE LOCATION MONITORING

BACKGROUND OF THE INVENTION

1. Technical Field

The present invention relates in general to improved telecommunications and in particular to a method for telephony based remote location monitoring. Still more particularly, the present invention relates to allocating a listen only channel from a caller telephony device to a remote location telephony device for the caller to monitor the audible occurrences at that remote location.

2. Description of the Related Art

A telephone carrier receives call requests, allocates systems resources to those call requests, and establishes a connection with a requested location. In a typical call, sufficient resources are allocated to establish bidirectional conversation, also known as full duplex bandwidth allocation. Other allocations of system resources, however, may be implemented that use less system resources and thus are often less expensive. For example, current telephones may include a "push-to-talk" feature that when selected directs the telephone carrier to only allocate system resources enabling the selector to talk and the recipient to listen, also known as half-duplex bandwidth allocation. When a "push-to-talk" feature is implemented, communication seems to operate in real time, however, typically the communication actually operates in near-real time with approximately a 0.25 to 2.0 second time lapse in the communication.

Teleconferencing systems are an example of another system that may allocate system resources for calls received and placed in a private telephone network. Teleconferencing systems may restrict some callers to listen only and allow other callers to listen and talk with full duplex allocation. In these systems, a participant calls into an intermediary teleconferencing system that handles the conference call within a private telephone network. The intermediary may reallocate resources during the conference call. For example, investors may call in to a particular number to listen to a board meeting. Investors may be restricted to listen only unless they are given time to speak by the board, in which case the intermediary system would allocate resources for the investor to talk.

While teleconferencing systems can control half duplex and full duplex resource allocation for a call, these systems are limited in application and require an intermediary system controlling communications between those participating in the conference, rather than a direct connection. Further, the teleconferencing system decides what resources to allocate to a caller, rather than allowing the caller to decide what resources are needed for the call.

Therefore, it would be advantageous to place callers in full control of the type of resource allocation needed for a call. In particular, it would be advantageous to place callers in control of placing a "listen only" call that allows the caller to request resource allocation that will allow the caller to listen in on a remote location via a telephone.

SUMMARY OF THE INVENTION

The invention generally provides an improved telecommunication system for enabling a caller to request the type of resources needed for a call. In particular, the invention provides a method, system, and program for allocating resources for telephony based remote location monitoring.

According to one aspect of the present invention, a caller requests at a caller telephony device to place a listen only call to a particular remote location telephony device. The caller may request the listen only call, for example, by depressing a button specified at the caller telephony device for placing listen only calls or by selecting a remote location device or group of devices from a database of listen only devices.

A telephone network receives the caller request to listen only to a remote location telephony device. The telephone network allocates a listen only channel between the caller telephony device and the remote location telephony device. The telephone network activates a microphone at the remote location telephony device via the listen only channel. Then, audio detected at the microphone is streamed via the listen only channel to the caller telephony device, such that the telephone network enables a caller to monitor a remote location through the remote location telephony device with minimized allocation of telephone network resources.

Additionally, the telephone network may request authorization for the caller to listen only at the remote location telephony device. The remote location telephony device preferably includes an authorized caller database. If the caller identity matches one of the entries in the authorized caller database, then the listen only call is authorized by the remote location telephony device. Responsive to the remote location telephony device authorizing a listen only communication, the microphone at the remote location telephony device is activated and the audio detected at the microphone is streamed to the caller telephony device.

Further, a caller may request that the telephone network access multiple remote telephony location devices via listen only channels. A caller may select to listen to a group of remote location telephony devices via a rotating listen only channel or through simultaneous listening channels allocated to each of the remote location telephony devices.

According to another aspect of the present invention, a caller requests at a caller telephony device to place a call for a remote location callee to listen only to the caller location. The telephone network receives the caller request for the remote location telephony device to listen only to the caller telephony device. The telephone network queries the remote location telephony device for authorization to listen only to the caller telephony device. If the authorization is received, then the telephone network allocates a listen only channel between the remote location telephony device and the caller telephony device. A microphone at the caller telephony device is activated and audio detected at the microphone is streamed via the listen only channel to the remote location telephony device.

A caller may also request that the telephone network change the listen only channel to a talk only channel. In this case, the telephone network deallocates the listen only channel and allocates a talk only channel between the caller telephony device and the remote location telephony device.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
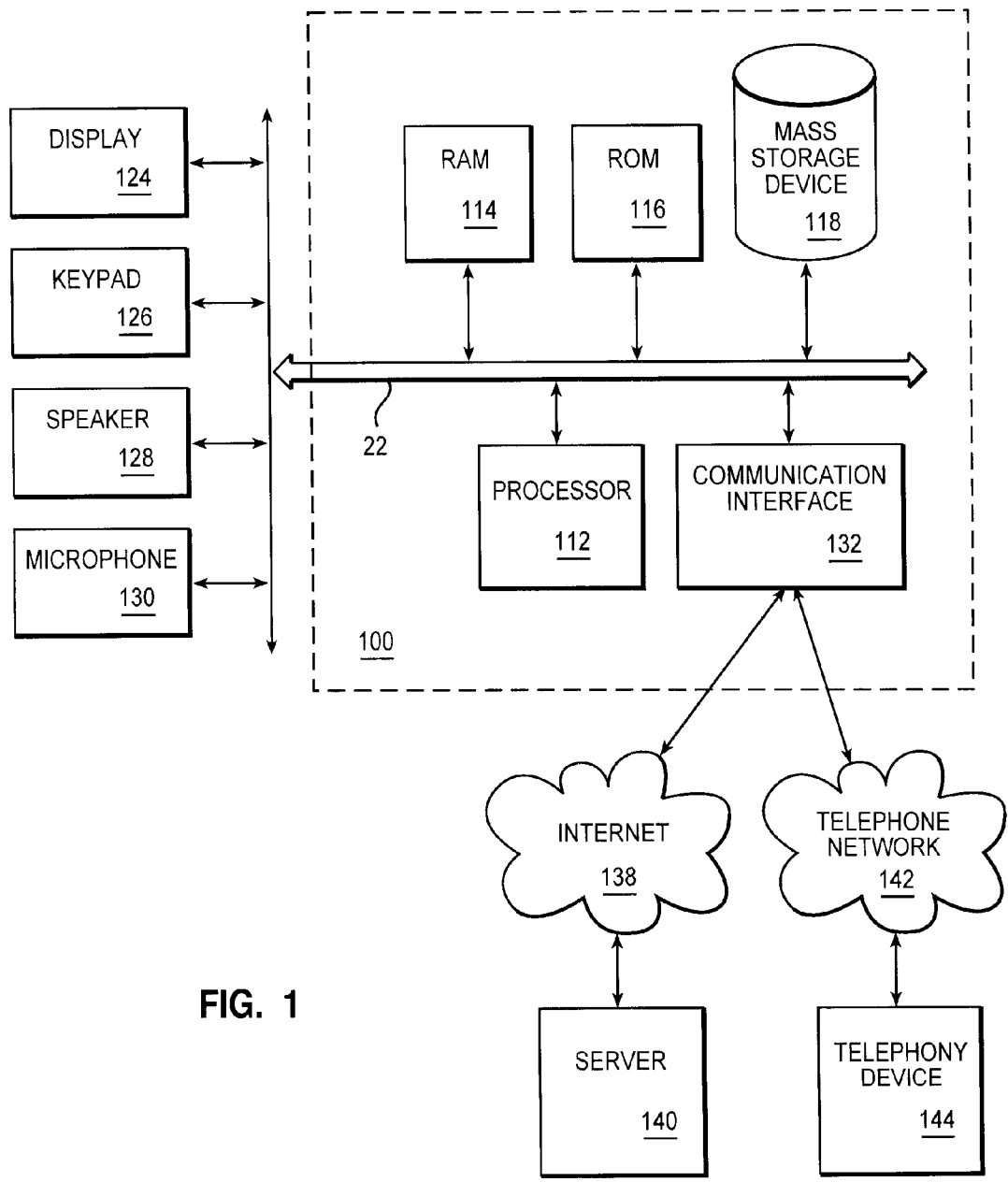
FIG. 1 is a block diagram depicting a system through which the present method, system, and program may be implemented.

Referring now to the drawings and in particular to FIG. 1, there is depicted one embodiment of a system through which the present method, system, and program may be implemented. The present invention may be executed in a variety of systems, including a variety of computing systems and electronic devices. Computer system 100 may be implemented as a telephone device or may be implemented within a telephone network. It will also be understood that the present invention may be implemented in standard telephony devices not enhanced by computing functions and in a standard telephone network not enhanced by computing systems.

Computer system 100 includes a bus 122 or other communication device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system preferably provides a graphical user interface (GUI) to the user. In a preferred embodiment, application software contains machine executable instructions that when executed on processor 112 carry out the operations depicted in the flowcharts of FIGS. 9, 10, 11, 12, 13 and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave or other propagation medium via a network link to a network, such as Internet 138, to a communications interface 132 coupled to bus 122. In particular, the network link may provide wired and/or wireless network communications to one or more networks. Internet 138 may refer to the worldwide collection of networks and gateways that use a particular protocol, such as Transmission Control Protocol (TCP) and Internet Protocol (IP), to communicate with one another.

Advantageously, in addition to communication via Internet 138, computer system 100 is enabled to communicate with other telephony devices, such as telephony device 144, via a telephone network 142. Telephone network 142 includes the public switched telephone system (PSTN), cellular networks, and other networks, such as the Internet, which continue to be incorporated into the telephone system.

Internet 138 and telephone network 142 both use electrical, electromagnetic, or optical signals that carry digital data streams. The signals through Internet 138 and telephone network 142 and the signals through communication interface 132, which carry the digital data to and from computer system 100, are exemplary forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

When implemented as a telephone device, computer system 100 typically includes multiple peripheral components that facilitate communication. These peripheral components are connected to multiple controllers, adapters, and expansion slots coupled to one of the multiple levels of bus 122. For example, a speaker 128 is connectively enabled on bus 122 for controlling audio output. A microphone 130 is connectively enabled on bus 122 for controlling audio input. A display device 124 is also connectively enabled on bus 122 for providing visual, tactile or other graphical representation formats. A keypad 126 is connectively enabled on bus 122 as an interface for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention. In particular, the telephone devices described throughout may be implemented with only portions of the components described for computer system 100.

Figure 2:
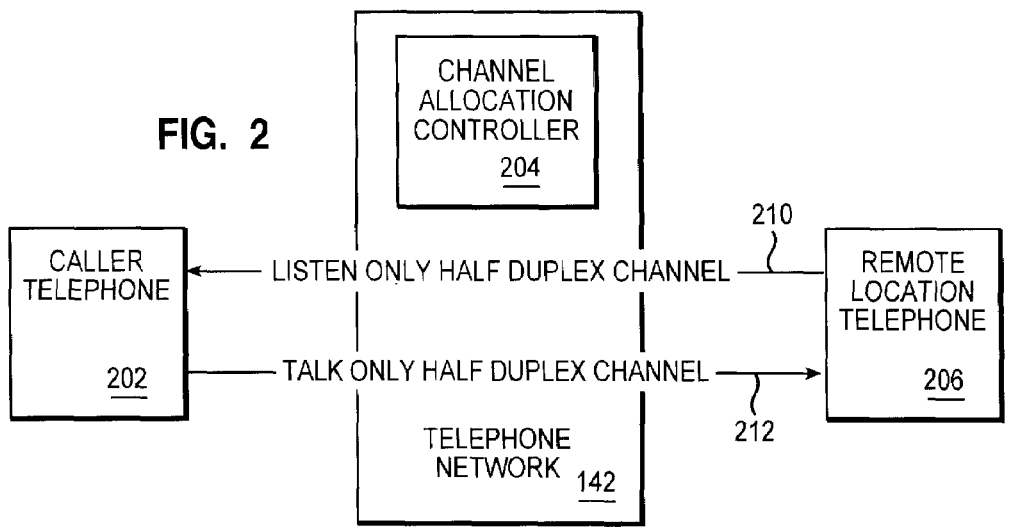
FIG. 2 is a block diagram depicting a distributed telephony system environment in accordance with the method, system, and program of the present invention.

With reference now to FIG. 2, there is depicted a block diagram of a distributed telephone system environment in accordance with the method, system, and program of the present invention. As illustrated, a caller telephone 200 and a remote location telephone 206 are connected via a telephone network 142. In particular, a channel allocation controller 204 receives call requests from caller telephone 202 and allocates telephone network resources to caller telephone 202. Channel allocation controller 204 may include a series of switches and hardwired circuits in addition to server systems and other computing devices.

In a traditional telephone call request, a user dials a number at caller telephone 202. Telephone network 142 receives the call request and channel allocation controller 204 attempts to connect with the destination device, such as remote location telephone 206. In a traditional call, a ring tone is transmitted to alert a callee to a call request. If remote location telephone 206 is answered, then a full duplex channel is allocated from communication between caller telephone 202 and remote location telephone 206.

In lieu of a traditional telephone request for full duplex communication, however, in the present invention a user at caller telephone 202 may press a button, such as a "push-to-talk" button, or select an option to "listen only". In this case, channel allocation controller 204 queries remote location telephone 206 with the identity of the user for a "listen only" call. In querying remote location telephone 206 for the "listen only" call, channel allocation controller 204 preferably omits the ring transmission, such that those at the remote location are not required to take overt action to acknowledge the call. The callee may be alerted that a listen only call is activated through an audible signal, a flashing LED indicator, a vibrate indication, or a graphical or text message on the callee's display.

A user may filter which callers can activate a listen only call at remote location telephone 206. In particular, remote location telephone 206 preferably includes a database of authorized "listen only" callers. The identity of the user is compared with the database of authorized "listen only" callers. If there is a match, remote location telephone 206 authorizes the call. When the call is authorized, channel allocation controller 204 transmits a signal that activates a microphone on remote location telephone 206. Additionally, channel allocation controller 204 allocates system resources of a listen only half duplex channel 210. Listen only half duplex channel 210 opens a channel for caller telephone 202 to listen to the audio picked up by remote location telephone 206. Advantageously, by allowing a caller to specify the type of features needed for a call, only those resources needed for the call are allocated. In particular, the "listen only" option may be advantageous in situations where, for example, a parent, guardian, employer, or other person would like to monitor what is happening at a remote location.

In addition to initiating a listen only call where the caller listens through remote location telephone 206, the caller may initiate a listen only call where the caller requests that the callee listen only to the caller telephone. Channel allocation controller 204 would first prompt the callee to authorize the listen only call and would then open a half duplex channel for remote location telephone 206 to listen to caller telephone 202.

Further, in lieu of a traditional telephone request, a user at caller telephone 202 may press a button or select an option to "talk only". In this case, channel allocation controller 204 will allocate talk only half duplex channel 212 where remote location telephone 206 can only listen and caller telephone 202 can talk.

It is important to note that while the present embodiment is described for purposes of illustration with a caller telephone 202 initiating a listen only call to a remote location telephone 206, a single telephony device may function as caller telephone 202 when initiating a "listen only" call and may function as remote location telephone 206 when receiving a "listen only" call request.

Figure 3:
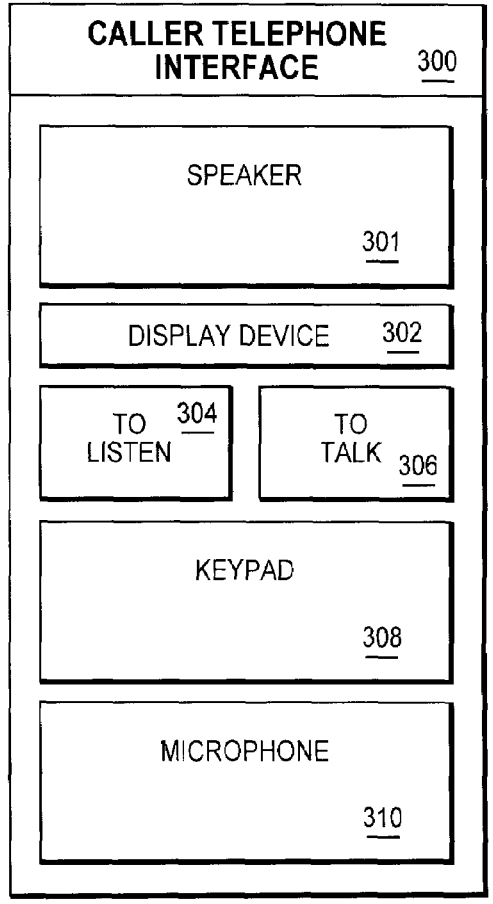
FIG. 3 is a block diagram depicting a caller telephone interface in accordance with the method, system, and program of the present invention.

Referring now to FIG. 3, there is depicted a block diagram of a caller telephone interface in accordance with the method, system, and program of the present invention. As illustrated, a caller telephone interface 300 includes a speaker 301 for projecting audio, a display device 302 for interfacing with the user, a keypad 306 for input of telephone numbers and other information to the caller telephone, and a microphone 310 for capturing audio.

Additionally, caller telephone interface 300 includes a "to listen" button 304 and a "to talk" button 306. Responsive to a user pressing "to listen" button 304, a listen only channel request is initiated and maintained while the button is pressed. The user may specify whether the listen only channel should allow the caller to listen to the remote location or the remote location to listen to the caller. Responsive to a user pressing "to talk" button 306, a talk only channel request is initiated and maintained while the button is pressed.

It will be understood that "to listen" button 304 and "to talk" button 306 are examples of one method for implementing the "listen only" and "talk only" functions. In an alternate embodiment of the invention, the "listen only" and "talk only" functions may be implemented through a toggle switch. Further, a user may select a displayed option on display device 302 to initiate either the "listen only" or "talk only" function. Moreover, a particular key within keypad 306 may be designated as a quick-connect key that when pressed once enables a fast connection to a listen only channel and when pressed twice enables a fast connection to a talk only channel.

Figure 4:
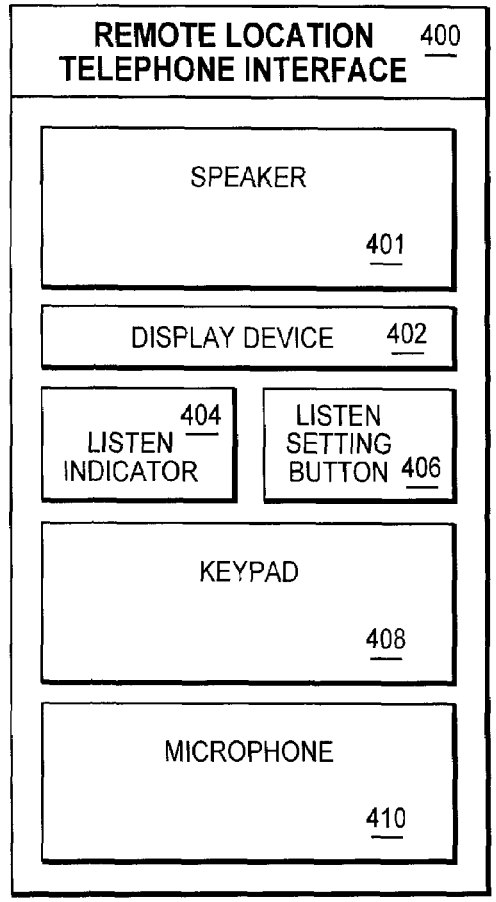
FIG. 4 is a block diagram depicting a remote location telephone interface in accordance with the method, system, and program of the present invention.

With reference now to FIG. 4, there is illustrated a block diagram of a remote location telephone interface in accordance with the method, system, and program of the present invention. As depicted, remote location telephone interface 400 includes a speaker 401 for projecting audio, a display device 402 for interfacing with the user, a keypad 406 for input of telephone numbers and other information to the remote location telephone, and a microphone 410 for capturing audio. While in the present embodiment microphone 410 is illustrated as an internal component of remote location telephone interface 400, for purposes of this invention, microphone 410 may be an external component. Further, microphone 410 may be a stand alone unit connected to remote location telephone interface 410. Additionally, multiple microphones may capture audio that is then combined at remote location telephone interface 400.

In addition, remote location telephone 400 also includes a listen setting button 406. A user preferably presses listen setting button 406 to access a list of authorized listeners viewable via display device 402. Additionally, when a user receives a phone call at remote location telephone interface 400 or places a phone call from remote location telephone interface 400, the user may press button 406 and quickly select to add the caller or callee identity to a list of authorized listeners. It will be understood that alternate interfaces may be used to implement a listen setting feature on a remote location telephone.

Further, remote location telephone 400 also includes a listen indicator 404. Listen indicator 404 may be a light emitting diode or other indicator that is turned on when a listen only channel is accessing the remote location telephone.

It is important to note that while in the present embodiment caller telephone interface 300 and remote location telephone interface 400 are described for purposes of illustration as different interfaces on different telephony devices, a single telephony device interface may incorporate the features of both described interfaces.

Figure 5:
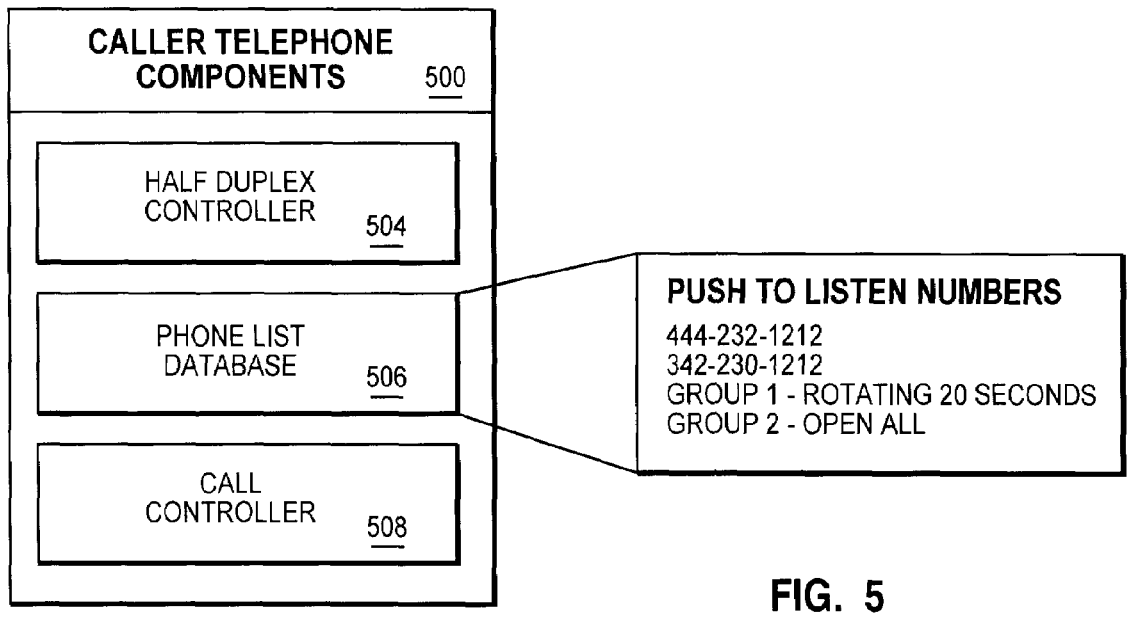
FIG. 5 is a block diagram depicting the internal functional components of a caller telephony device in accordance with the method, system, and program of the present invention.

Referring now to FIG. 5, there is depicted a block diagram of the internal functional components of a caller telephony device in accordance with the method, system, and program of the present invention. As illustrated, a caller telephone includes caller telephone components 500. First, caller telephone components 500 include a half duplex controller 504 that detects when a "listen only" or "talk only" selection is made, whether a group call request is selected, and requests that a call be placed with a "listen only" or "talk only" channel to the selected recipient(s).

Additionally, caller telephone components 500 includes a phone list database 506 that stores names and telephone numbers that are easily retrievable and dialed. In particular, as illustrated, a user may store particular numbers as push to listen numbers that when selected from the list, are automatically dialed as "listen only". Further, when specifying "listen only" numbers, groups of remote telephones may be selected. The group may include a single telephone number that accesses multiple telephones. Alternatively, the group may include multiple telephone numbers. Further, the group specification may designate a single "listen only" channel that rotates from member to member or a "listen only" channel for each group member. In the example, depicted for phone list database 506, group 1 is designating as a rotating channel group where the listen only channel rotates to the next group member every twenty seconds. In addition, in the example, group 2 is designated as an all channel group where a separate listen only channel is initiated for each group member such that listening to all channels may occur simultaneously. It will be understood that in addition to selecting groups of remote telephones to which the caller can listen only, the caller may also select groups of remote telephones that listen only to the caller location.

Further, caller telephone components 500 include a call controller 508 that controls the other calling functions of the caller telephone. It will be understood that in addition to the components illustrated, additional components that are implemented in a telephony device may be included.

Figure 6:
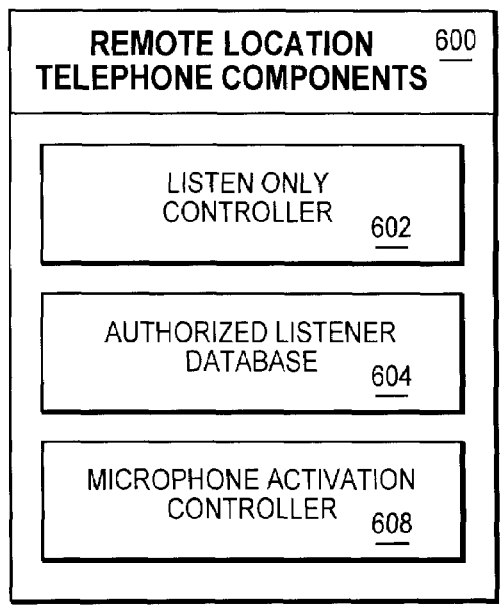
FIG. 6 is a block diagram depicting the internal functional components of a remote location telephony device in accordance with the method, system, and program of the present invention.

With reference now to FIG. 6, there is illustrated a block diagram of the internal functional components of a remote location telephony device in accordance with the method, system, and program of the present invention. As depicted, a remote location telephone includes remote location telephone components 600.

Remote location telephone components 600 include a listen only controller 602 that controls the listen only functions of the remote locations telephone. In particular, listen only controller 602 controls the listen only interface with a user at the remote location telephone and controls the authorization of listen only requests.

In addition, remote location telephone components 600 include an authorized listener database 604 that stores the identities of authorized listeners. Identities may be stored as a telephone number, a name, a voice sample, or other identifier.

Further, remote location telephone components 600 include a microphone activation controller 608. Microphone activation controller 608 activates the microphone at the remote location telephone in response to receiving a request from the telephone network for a listen only call. Further, microphone activation controller 608 disables the microphone at the remote location telephone in response to receiving a termination signal for the listen only call from the telephone network. Microphone activation controller 608 may include circuitry or microcode that can be activated by the telephone network.

It is important to note that while the present embodiment is described for purposes of illustration with caller telephone components 500 and remote location telephone components 600 as independent sets of telephony components, a single telephony device may incorporate both sets of components, such that a single telephony device may both place "listen only" calls and handle requests for "listen only" calls.

Figure 7:
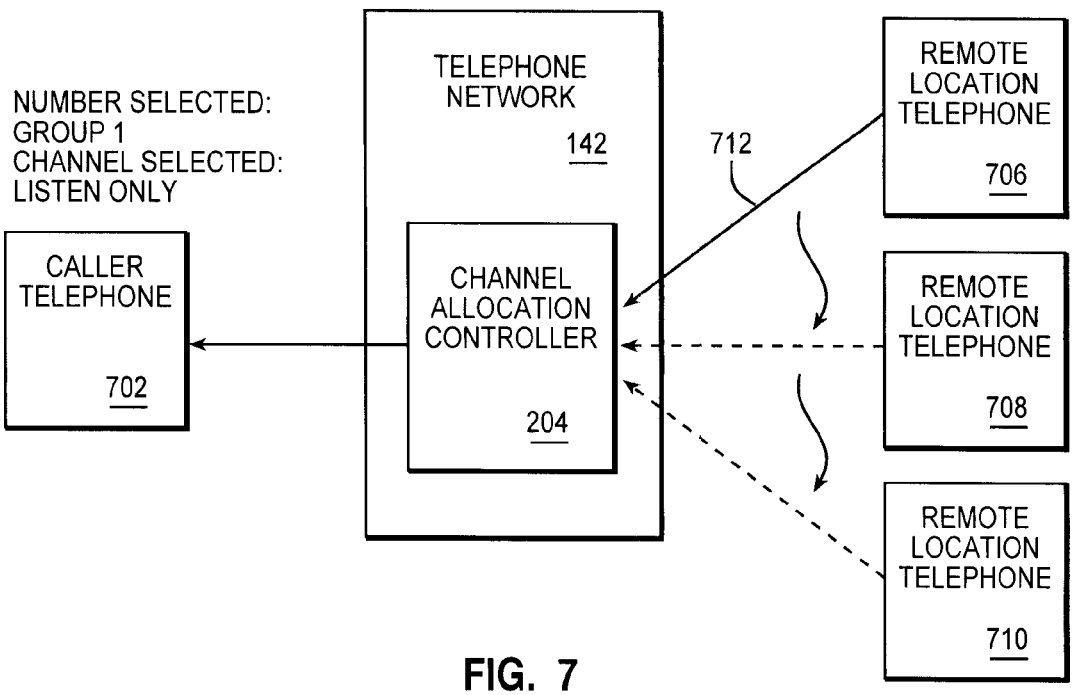
FIG. 7 is an illustrative representation of a group listen only call with a single channel rotating among group members in accordance with the method, system, and program of the present invention.

Referring now to FIG. 7, there is depicted an illustrative representation of a group listen only call with a single channel rotating among group members in accordance with the method, system, and program of the present invention. As depicted, a caller has selected "group 1" from the phone list database and the "listen only" channel at caller telephone 702. Channel allocation controller 204 receives the request and allocates a listen only channel to remote location telephone 706, as illustrated as reference numeral 712. Then, after opening the channel illustrated at reference numeral 712 for a set period of time, such as twenty seconds, the channel is closed and a new "listen only" channel is opened with remote location telephone 708. Thus, the "listen only" channel rotates from remote location telephone 706 to 708 to 710 and then back to 706. In the example, each of remote location telephones 706, 708, and 710 are accessible via the same telephone number. Thus, a parent may call "group 1" which includes the group of remote telephones within the home and rotate listening at each telephone, using minimized resources by rotating a single "listen only" channel from telephone to telephone.

As an additional advantage, while listening to one remote location telephone, such as remote location telephone 706, a caller may select to initiate a "talk only" channel with another telephone in the group, such as remote location telephone 710. Thus, a caller may monitor a location by scanning the noise at a group of telephones and may also talk through one of the remote location phones if requested.

Figure 8:
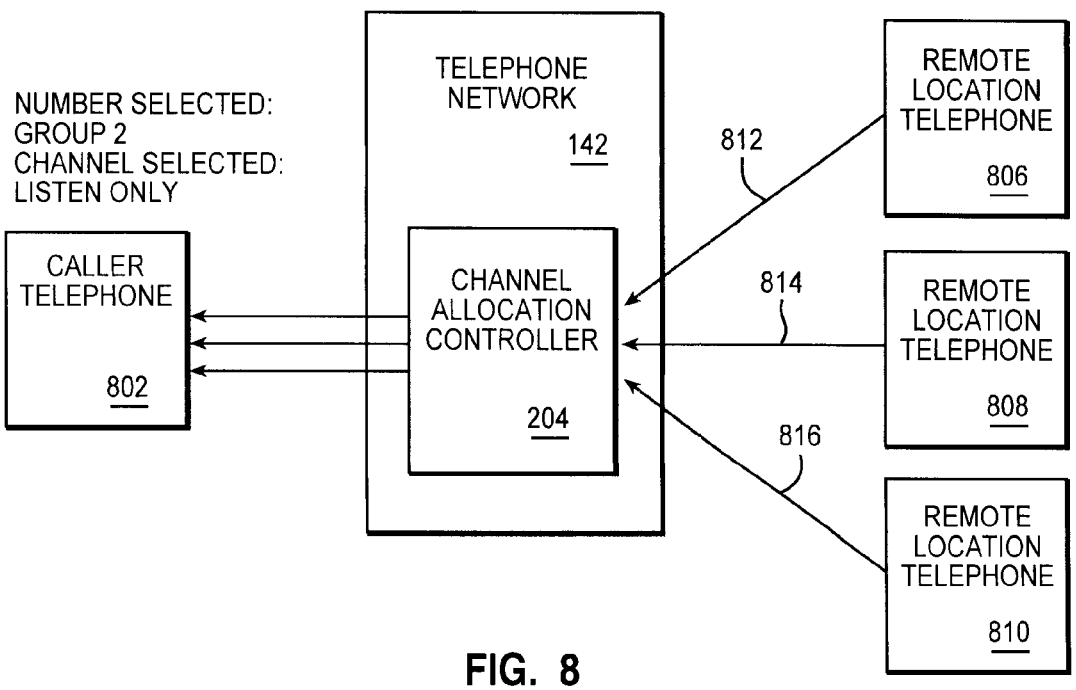
FIG. 8 is an illustrative representation of a group listen only call with a separate listen only channel for each group member in accordance with the method, system, and program of the present invention.

With reference now to FIG. 8, there is depicted an illustrative representation of a group listen only call with a separate listen only channel for each group member in accordance with the method, system, and program of the present invention. As depicted, a caller has selected "group 2" from the phone list database and the "listen only" channel at caller telephone 802. Channel allocation controller 204 receives the request and allocates a separate listen only channel to each of remote location telephones 806, 808, and 810, as illustrated as reference numeral 812. In the example, each of remote location telephones 806, 808, and 810 are accessible via the same telephone number. Thus, a parent may call "group 2" which includes the group of remote telephones within the home and listen to all of the phones at the same time, still using minimized resources by only requesting a "listen only" channel.

Figure 9:
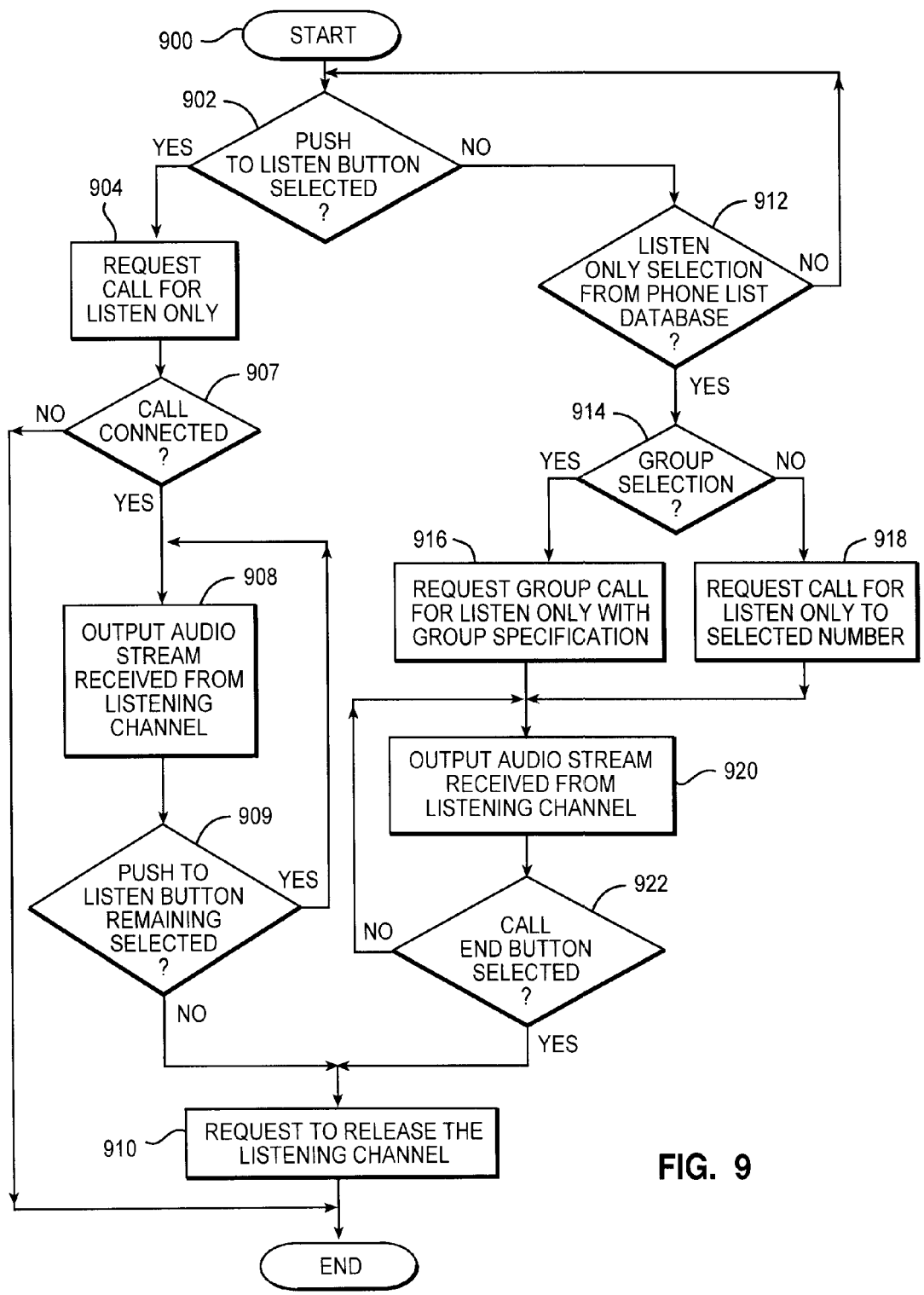
FIG. 9 is a high level logic flowchart depicting a process and program for controlling a caller telephone in accordance with the method, system, and program of the present invention.

Referring now to FIG. 9, there is illustrated a high level logic flowchart of a process and program for controlling a caller telephone in accordance with the method, system, and program of the present invention. As depicted, the process starts at block 900 and thereafter proceeds to block 902. Block 902 illustrates a determination whether the push to listen button is selected. If the push to listen button is selected, then the process passes to block 904. Block 904 depicts requesting a call for listening only. The telephone number may be one entered by the user or selected from a phone list database. Next, block 907 depicts a determination whether the call connected. If the call is not connected, then the process ends. If the call connected, then the process passes to block 908. Block 908 illustrates controlling output of the audio stream received from the listening channel to a speaker or other audio output device. Next, block 909 depicts a determination whether the push to listen button remains selected. If the push to listen button does not remain selected, then the process passes to block 910. If the push to listen button remains selected, then the process returns to block 908.

Alternatively, at block 902, if the push to listen button is not selected, then the process passes to block 912. Block 912 depicts a determination whether there is a listen only selection from the phone list database. If there is not a listen only selection from the phone list database, then the process returns to block 902. If there is a listen only selection from the phone list database, then the process passes to block 914. Block 914 illustrates a determination whether a group selection is made from the phone list database. If a group selection is made, then the process passes to block 916. Block 916 depicts requesting a listen only group call with the group specification, and the process passes to block 920. The group specification includes the telephone numbers of the group members and the type of channel allocation. Alternatively, at block 914, if a group selection is not made, then the process passes to block 918. Block 918 depicts requesting a listen only call for the selected number, and the process passes to block 920. Block 920 depicts controlling output of the audio stream received from the listening channel to a speaker or other audio output device. Next, block 922 illustrates a determination whether a call end button is selected. If a call end button is not selected, then the process passes to block 920. If the call end button is selected, then the process passes to block 910. Block 910 depicts requesting that the telephone network release the listening channel, and the process ends.

Figure 10A:
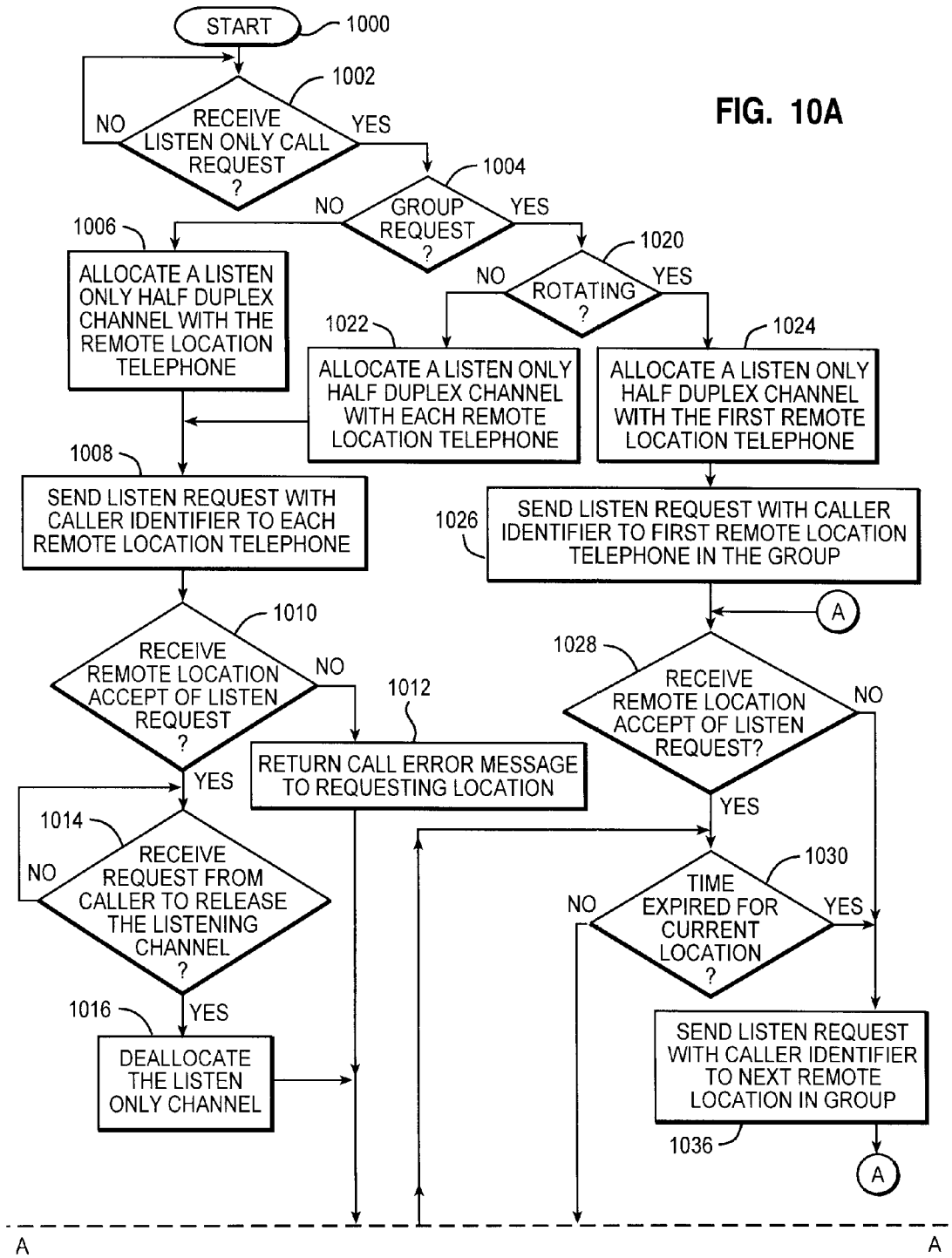
FIG. 10 is a high level logic flowchart depicting a process and program for controlling a telephone network enabled to handle listen only calls.
Figure 10B:
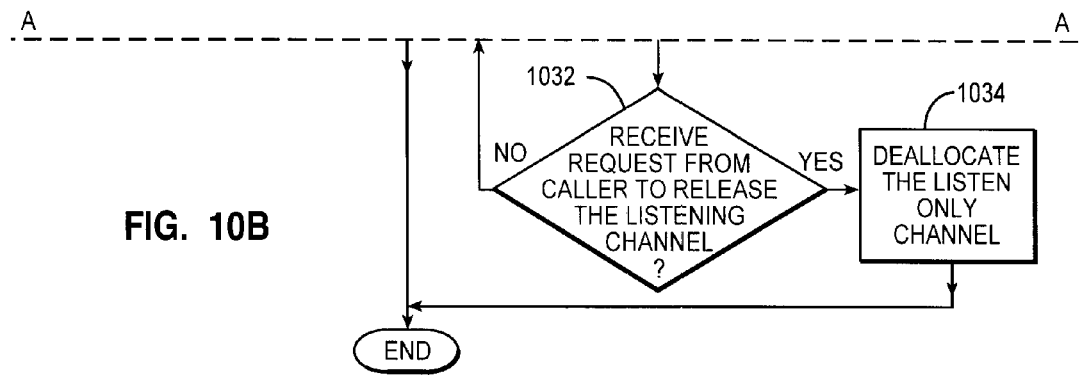

With reference now to FIG. 10, there is illustrated a high level logic flowchart of a process and program for controlling a telephone network enabled to handle listen only calls. As depicted, the process starts at block 1000 and thereafter proceeds to block 1002. Block 1002 depicts a determination whether a listen only call request is received. If a listen only call request is not received, then the process iterates at block 1002. If a listen only call request is received, then the process passes to block 1004. Block 1004 illustrates a determination whether a group request is received. If a group request is not received, then the process passes to block 1006. If a group request is received, then the process passes to block 1020.

Block 1006 depicts allocating a listen only half duplex channel with the remote location telephone. Next, block 1008 illustrates sending a listen request with the caller identifier to each remote location telephone. Thereafter, block 1010 depicts a determination whether the remote location telephone accepted the listening request. Where there is a group of remote location telephones called, a determination is made whether each location accepts the listening request. If the listening request is not accepted, then the process passes to block 1012. Block 1012 illustrates returning a call error message to the requesting location, and the process ends. Alternatively, if the remote location telephone accepts the listen request, then the process passes to block 1014. If the request to release the listening channel is received, then the process passes to block 1016. Block 1016 depicts deallocating the listen only channel, and the process ends. In additional to deallocating the listen only channel, the microphone at the remote location telephony device may be deactivated. Alternatively, at block 1014, if a request to release the listening channel is not received, then the process iterates at block 1014.

Block 1020 depicts a determination whether the group request is for a rotating group channel. If the group request is not for a rotating group, then the process passes to block 1022. Block 1022 illustrates allocating a listen only half duplex channel with each remote location telephone, and the process passes to block 1008. Alternatively, at block 1020, if the group request is for a rotating group, then the process passes to block 1024.

Block 1024 depicts allocating a listen only half duplex channel with the first remote telephone location. Next, block 1026 illustrates sending the listen request with a caller identifier to the first remote location telephone in the group. Thereafter, block 1028 depicts a determination whether the remote location accepts the listen request. If the remote location does not accept the listen request, then the process passes to block 1036. Block 1036 illustrates sending the listen request with a caller identifier to the next remote location, and the process passes to block 1028.

Alternatively, at block 1028, if the remote location accepts the listen request, then the process passes to block 1030. Block 1030 depicts a determination whether the time expired for the current location. If the time has not expired, then the process passes to block 1032. If the time has expired, then the process passes to block 1036. Although not depicted, the process may include a step requiring a signal to activate a push to listen alert. In particular, for group listening, the first request of a listen only channel may alert the callee of the listening event. Then, subsequent requests, within a selected time value, as when rotating requests to a group of listeners, may optionally alert each callee of the listen only call. The time value may be selected, for example, by taking the number of listeners in the group times the expiration time value. If a subsequent request to listen is delayed beyond the calculated time value, then may be treated as a first push to listen request, and the push to listen alert process is initiated.

Block 1032 illustrates a determination whether a request to release the listening channel is received from the caller. If the request to release is not received, then the process passes to block 1030. If the request to release is received, then the process passes to block 1034. Block 1034 depicts deallocating the listen only channel, and the process ends. In addition, the microphone at the remote location telephony device may be deactivated.

Figure 11:
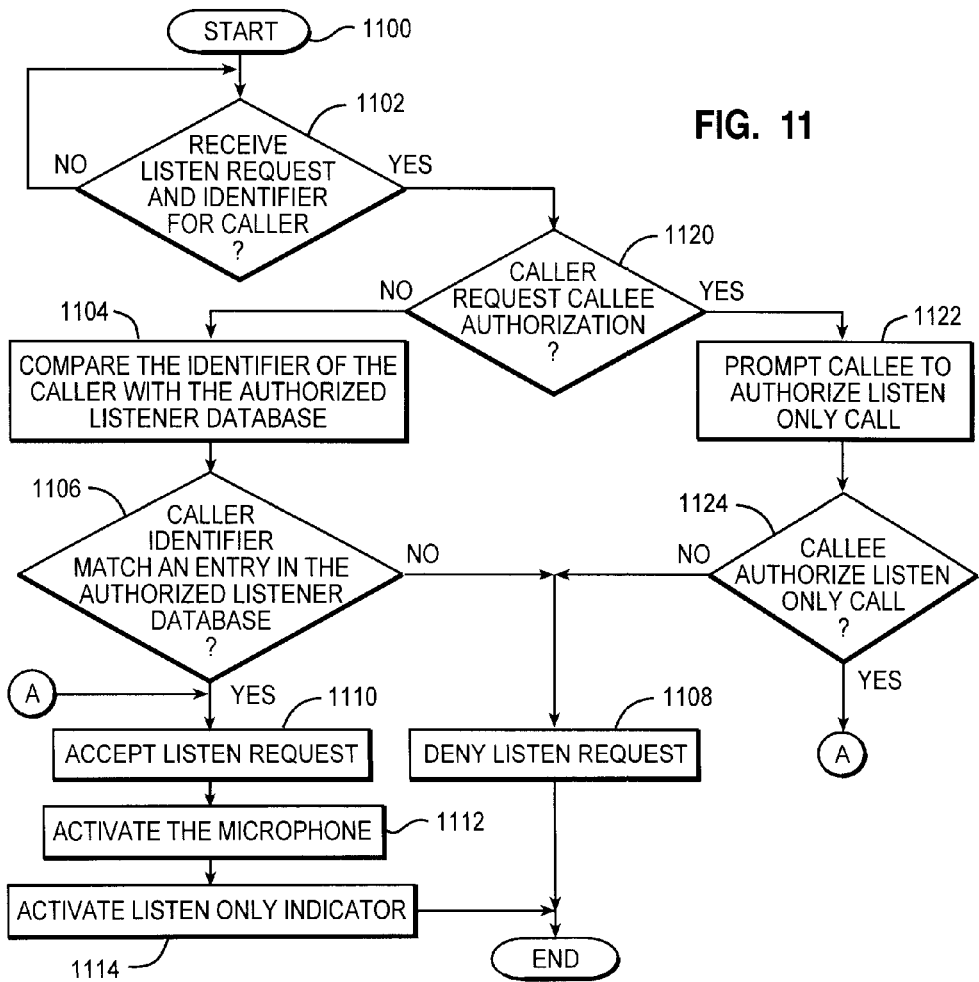
FIG. 11 is a high level logic flowchart depicting a process and program for controlling a remote location telephone.

Referring now to FIG. 11, there is depicted a high level logic flowchart of a process and program for controlling a remote location telephone. As depicted, the process starts at block 1100 and thereafter proceeds to block 1102. Block 1102 illustrates a determination whether a listen request and identifier for a listening party are received. If a listen request and identifier are not received, the process iterates at block 1102. If a listen request and identifier are received, then the process passes to block 1120.

Block 1120 depicts a determination whether the caller requests callee authorization. When initiating a listen only call, a caller may request that the callee specifically authorize the listen only call. If the caller does not request callee authorization, then the process passes to block 1104. Block 1104 depicts comparing the identifier of the caller with the authorized listener database. Next, block 1106 illustrates a determination whether the caller identifier matches an entry in the authorized listener database. If the caller identifier does not match an entry in the authorized listener database, then the process passes to block 1108. Block 1108 depicts denying the listen request, and the process ends. Alternatively, at block 1106, if the caller identifier matches an entry in the authorized listener database, then the process passes to block 1110. Block 1110 illustrates accepting the listen request. Next, block 1112 depicts activating the microphone from the listen request. Thereafter, block 1114 depicts activating the listen only indicator, and the process ends.

Alternatively at block 1120, if the caller requests callee authorization, then the process passes to block 1122. Block 1122 depicts prompting the callee to authorize the listen only call. Next, block 1124 illustrates a determination whether the callee authorizes the listen only call. If the callee authorizes the listen only call, then the process passes to block 1110. If the callee does not authorize the listen only call, then the process passes to block 1108.

Figures 12, 13:
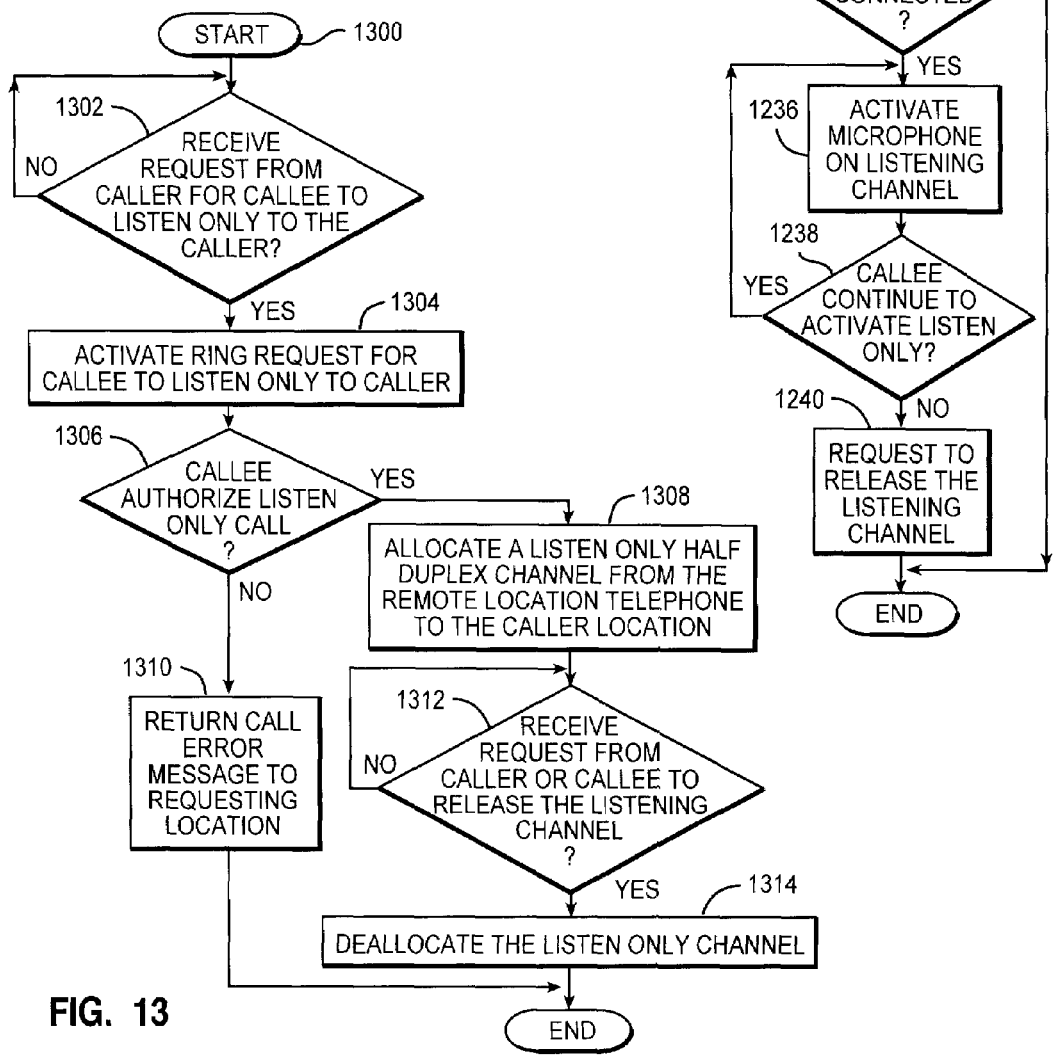
FIG. 12 is a high level logic flowchart of a process and program for initiating a callee listen only call in accordance with the method, system, and program of the present invention.
FIG. 13 is a high level logic flowchart of a process and program for a telephone network controlling a listen only call where a callee listens only to a caller who initiates the listen only call in accordance with the method, system, and program of the present invention.

With reference now to FIG. 12, there is illustrated a high level logic flowchart of a process and program for initiating a callee listen only call in accordance with the method, system, and program of the present invention. As depicted, the process starts in the caller telephony system at block 1200 and thereafter proceeds to block 1230. Block 1230 illustrates a determination whether the caller initiates a request for the callee to listen only to the caller. If the caller does not initiate the callee to listen only to the caller, then the process iterates at block 1230. If the caller initiates the call, then the process passes to block 1232. Block 1232 depicts requesting the callee to listen only to the caller. Next, block 1234 illustrates a determination of whether the call connected. If the call does not connect, then the process ends. If the call connects, then the process passes to block 1236. Block 1236 depicts activating the microphone on the listening only channel opened for the callee to listen only to the caller. Next, block 1238 illustrates a determination whether the callee continues to activate the listen only call. If the callee continues to activate, then the process returns to block 1236. If the callee does not continue to activate, then the process passes to block 1240. Block 1240 depicts requesting to release the listening channel, and the process ends.

Referring now to FIG. 13, there is depicted a high level logic flowchart of a process and program a telephone network for controlling a listen only call where a callee listens only to a caller who initiates the listen only call in accordance with the method, system, and program of the present invention. As illustrated, the process starts in the telephone network controller at block 1300 and thereafter proceeds to block 1302. Block 1302 depicts a determination whether a request is received from a caller to request the callee to listen only to the caller. If the request is not received, then the process iterates at block 1302. If the request is received, then the process passes to block 1304. Block 1304 illustrates activating the ring request for the callee to listen only to the caller. Thereafter, block 1306 depicts a determination whether the callee has authorized the listen only call. If the callee does not authorize the listen only call, then an error message is returned to the call, as depicted at block 1310, and the process ends. If the callee does authorize the listen only call, then the process passes to block 1308. Block 1308 illustrates allocating a listen only half duplex channel from the remote location telephone to the caller location. Next, block 1310 depicts a determination whether a request from the caller or callee to release the listening channel is received. If a request is not received, then the process iterates at block 1312. If a request is received, then the process passes to block 1314. Block 1314 illustrates deallocating the listen only channel, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for controlling a telephone network for telephony based remote location monitoring, comprising:
   responsive to receiving a caller request to listen only to a remote location telephony device, allocating a listen only channel between a caller telephony device and said remote location telephony device;
   activating a microphone at said remote location telephony device via said listen only channel;
   streaming audio detected at said microphone via said listen only channel to said caller telephony device;
   responsive to receiving said caller request to listen only to a plurality of remote location telephony devices by rotating said listen only channel among said plurality of remote location telephony devices, monitoring a current time period that said listen only channel is allocated between said caller telephony device and said remote location telephony device;
   responsive to said current time period exceeding a rotation time limit, deallocating said listen only channel between said caller telephony device and said remote location telephony device; and reallocating said listen only channel between said caller telephony device and a next remote location telephony device from among said plurality of remote location telephony devices.

2. The method according to claim 1 for controlling a telephone network for telephony based remote location monitoring, further comprising:
  requesting authorization for said caller to listen only at said remote location telephony device;
  responsive to at least one from among said remote location telephony device and a user at said remote location telephony device authorizing a listen only communication, activating said microphone at said remote location telephony device and streaming said audio detected at said microphone to said caller telephony device.

3. The method according to claim 1 for controlling a telephone network for telephony based remote location monitoring, further comprising:
  responsive to receiving said caller request to listen only to said plurality of remote location telephony device simultaneously, allocating a separate listen only channel between each of said plurality of remote location telephony devices and said caller telephony device.

4. The method according to claim 1 for controlling a telephone network for telephony based remote location monitoring, further comprising:
  responsive to receiving a caller request to talk only to said remote location telephony device while said listen only channel is allocated, deallocating said listen only channel and allocating a talk only channel.

5. The method according to claim 1 for controlling a telephone network for telephony based remote location monitoring, further comprising:
  responsive to receiving a caller request to end said call, deallocating said listen only channel.

6. A system for controlling a telephone network for telephony based remote location monitoring, comprising:
  a telephone network for allocating communication channels between a caller telephony device and a remote location telephony device;
  said telephone network further comprising:
  means, responsive to receiving a caller request to listen only to said remote location telephony device, for allocating a listen only channel between said caller telephony device and said remote location telephony device;
  means for activating a microphone at said remote location telephony device via said listen only channel;
  means for streaming audio detected at said microphone via said listen only channel to said caller telephony device;
  means, responsive to receiving said caller request to listen only to a plurality of remote location telephony devices by rotating said listen only channel among said plurality of remote location telephony devices, for monitoring a current time period that said listen only channel is allocated between said caller telephony device and said remote location telephony device;
  means, responsive to said current time period exceeding a rotation time limit, for deallocating said listen only channel between said caller telephony device and said remote location telephony device; and
  means for reallocating said listen only channel between said caller telephony device and a next remote location telephony device from among said plurality of remote location telephony devices.

7. The system according to claim 6 for controlling a telephone network for telephony based remote location monitoring, said telephone network further comprising:
  means for requesting authorization for said caller to listen only at said remote location telephony device;
  means, responsive to at least one from among said remote location telephony device and a user at said remote location telephony device authorizing a listen only communication, for activating said microphone at said remote location telephony device and streaming said audio detected at said microphone to said caller telephony device.

8. The system according to claim 6 for controlling a telephone network for telephony based remote location monitoring, said telephone network further comprising:
  means, responsive to receiving said caller selection to listen only to said plurality of remote location telephony device simultaneously, for allocating a separate listen only channel between each of said plurality of remote location telephony devices and said caller telephony device.

9. The system according to claim 6 for controlling a telephone network for telephony based remote location monitoring, said telephone network further comprising:
  means, responsive to receiving a caller selection to talk only to said remote location telephony device while said listen only channel is allocated, for deallocating said listen only channel and allocating a talk only channel.

10. The system according to claim 6 for controlling a telephone network for telephony based remote location monitoring wherein said telephone network comprises at least one from among a wireless communication network, a public switched telephone network, and an Internet based communication network.

11. A computer program product for controlling a telephone network for telephony based remote location monitoring, comprising:
  a recording medium;
  means, recorded on said recording medium, for allocating a listen only channel between a caller telephony device and a remote location telephony device, responsive to receiving a caller request to listen only to said remote location telephony device;
  means, recorded on said recording medium, for activating a microphone at said remote location telephony device via said listen only channel;
  means, recorded on said recording medium, for streaming audio detected at said microphone via said listen only channel to said caller telephony device;
  means, recorded on said recording medium, for monitoring a current time period that said listen only channel is allocated between said caller telephony device and said remote location telephony device, in response to receiving said caller request to listen only to a plurality of remote location telephony devices by rotating said listen only channel among said plurality of remote location telephony devices;
  means, recorded on said recording medium, for deallocating said listen only channel between said caller telephony device and said remote location telephony device, in response to said current time period exceeding a rotation time limit; and
  means, recorded on said recording medium, for reallocating said listen only channel between said caller telephony device and a next remote location telephony device from among said plurality of remote location telephony devices.

12. The computer program product according to claim 11 for controlling a telephone network for telephony based remote location monitoring, further comprising:
   means, recorded on said recording medium, for requesting authorization for said caller to listen only at said remote location telephony device;
   means, recorded on said recording medium, for activating said microphone at said remote location telephony device and streaming said audio detected at said microphone to said caller telephony device, in response to at least one from among said remote location telephony device and a user at said remote location telephony device authorizing said listen only communication.

13. The computer program product according to claim 11 for controlling a telephone network for telephony based remote location monitoring, further comprising:
   means, recorded on said recording medium, for allocating a separate listen only channel between each of said plurality of remote location telephony devices and said caller telephony device, responsive to receiving said caller request to listen only to said plurality of remote location telephony device simultaneously.

14. The computer program product according to claim 11 for controlling a telephone network for telephony based remote location monitoring, further comprising:
   means, recorded on said recording medium, for deallocating said listen only channel and allocating a talk only channel, in response to receiving a caller request to talk only to said remote location telephony device while said listen only channel is allocated.

15. The computer program product according to claim 11 for controlling a telephone network for telephony based remote location monitoring, further comprising:
   means, recorded on said recording medium, for deallocating said listen only channel, responsive to receiving a caller request to end said call.

16. A method for enabling caller initiated telephony based remote location monitoring, comprising:
   responsive to detecting a caller selection to listen only to a remote location telephony device, sending a request to a telephone network to allocate a listen only channel between a caller telephony device and said remote location telephony device;
   receiving an audio stream from said remote location telephony device at said caller telephony device via said listen only channel while said caller continues to select to listen only to said remote location telephony device, such that a listener is enabled to initiate monitoring said remote location with minimized allocation of resources; and
   responsive to detecting said caller selection to listen only to a plurality of remote location telephony devices through a rotating listen only channel, sending said request to said telephone network to allocate a rotating listen only channel between said caller telephony device and a plurality of remote location telephony devices.

17. The method according to claim 16 for enabling caller initiated telephony based remote location monitoring, further comprising:
   only receiving said audio stream from said remote location telephony device if said caller at said caller telephony device is authorized to listen only to said remote location telephony device.

18. The method according to claim 16 for enabling caller initiated telephony based remote location monitoring, further comprising:
   detecting said caller selection to listen only to said remote location telephony device from a selection of a telephone number previously stored in a database accessible to said caller telephony device as a listen only telephone number.

19. The method according to claim 16 for enabling caller initiated telephony based remote location monitoring, further comprising:
   detecting said caller selection to listen only to said remote location telephony device from a depression of a button designated as a listen only trigger button.

20. The method according to claim 16 for enabling caller initiated telephony based remote location monitoring, further comprising:
   detecting said caller selection to listen only to said plurality of remote location telephony devices simultaneously; and
   sending said request to said telephone network to allocate a separate listen only channel between said caller telephony device and each of said plurality of remote location telephony devices.

21. The method according to claim 16 for enabling caller initiated telephony based remote location monitoring, further comprising:
   detecting a second selection to end said listen only call; and
   sending a request to said telephone network to deallocate said listen only channel.

22. A system for enabling caller initiated telephony based remote location monitoring, comprising:
   a caller telephony device communicatively connected to a telephone network;
   said caller telephony device further comprising:
   means, responsive to detecting a caller selection to listen only to a remote location telephony device, for sending a request to said telephone network to allocate a listen only channel between said caller telephony device and said remote location telephony device;
   means for receiving an audio stream from said remote location telephony device at said caller telephony device via said listen only channel while said caller continues to select to listen only to said remote location telephony device; and
   means, responsive to detecting said caller selection to listen only to a plurality of remote location telephony devices through a rotating listen only channel, for sending said request to said telephone network to allocate a rotating listen only channel between said caller telephony device and a plurality of remote location telephony devices.

23. The system according to claim 22 for enabling caller initiated telephony based remote location monitoring, said caller telephony device further comprising:
   means for only receiving said audio stream from said remote location telephony device if said caller at said caller telephony device is authorized to listen only to said remote location telephony device.

24. The system according to claim 22 for enabling caller initiated telephony based remote location monitoring, said caller telephony device further comprising:
   means for detecting said caller selection to listen only to said remote location telephony device from a selection of a telephone number previously stored in a database accessible to said caller telephony device as a listen only telephone number.

25. The system according to claim 22 for enabling caller initiated telephony based remote location monitoring, said caller telephony device further comprising:
   means for detecting said caller selection to listen only to said remote location telephony device from a depression of a button designated as a listen only trigger button.

26. The system according to claim 22 for enabling caller initiated telephony based remote location monitoring, said caller telephony device further comprising:
   means for detecting said caller selection to listen only to said plurality of remote location telephony devices simultaneously; and
   means for sending said request to said telephone network to allocate a separate listen only channel between said caller telephony device and each of said plurality of remote location telephony devices.

27. The system according to claim 22 for enabling caller initiated telephony based remote location monitoring, said caller telephony device further comprising:
   means for detecting a second selection to end said listen only call; and
   means for sending a request to said telephone network to deallocate said listen only channel.

28. A computer program product for enabling caller initiated telephony based remote location monitoring, comprising:
   a recording medium;
   means, recorded on said recording medium, for sending a request to a telephone network to allocate a listen only channel between a caller telephony device and a remote location telephony device, in response to detecting a caller selection to listen only to said remote location telephony device;
   means, recorded on said recording medium, for receiving an audio stream from said remote location telephony device at said caller telephony device via said listen only channel while said caller continues to select to listen only to said remote location telephony device; and
   means, recorded on said recording medium, responsive to detecting said caller selection to listen only to a plurality of remote location telephony devices through a rotating listen only channel, for sending said request to said telephone network to allocate a rotating listen only channel between said caller telephony device and a plurality of remote location telephony devices.

29. The computer program product according to claim 28 for enabling caller initiated telephony based remote location monitoring, said caller telephony device further comprising:
   means, recorded on said recording medium, for only receiving said audio stream from said remote location telephony device if said caller at said caller telephony device is authorized to listen only to said remote location telephony device.

30. The computer program product according to claim 28 for enabling caller initiated telephony based remote location monitoring, said caller telephony device further comprising:
   means, recorded on said recording medium, for detecting said caller selection to listen only to said remote location telephony device from a selection of a telephone number previously stored in a database accessible to said caller telephony device as a listen only telephone number.

31. The computer program product according to claim 28 for enabling caller initiated telephony based remote location monitoring, said caller telephony device further comprising:
   means, recorded on said recording medium, for detecting said caller selection to listen only to said remote location telephony device from a depression of a button designated as a listen only trigger button.

32. The computer program product according to claim 28 for enabling caller initiated telephony based remote location monitoring, said caller telephony device further comprising:
   means, recorded on said recording medium, for detecting said caller selection to listen only to said plurality of remote location telephony devices simultaneously; and
   means, recorded on said recording medium, for sending said request to said telephone network to allocate a separate listen only channel between said caller telephony device and each of said plurality of remote location telephony devices.

33. The computer program product according to claim 28 for enabling caller initiated telephony based remote location monitoring, said caller telephony device further comprising:
   means, recorded on said recording medium, for detecting a second selection to end said listen only call; and
   means, recorded on said recording medium, for sending a request to said telephone network to deallocate said listen only channel.

* * * * *